Dec. 20, 1960 M. P. SHORB 2,965,722
MAGNETIC REPRODUCING APPARATUS
Filed Feb. 4, 1957
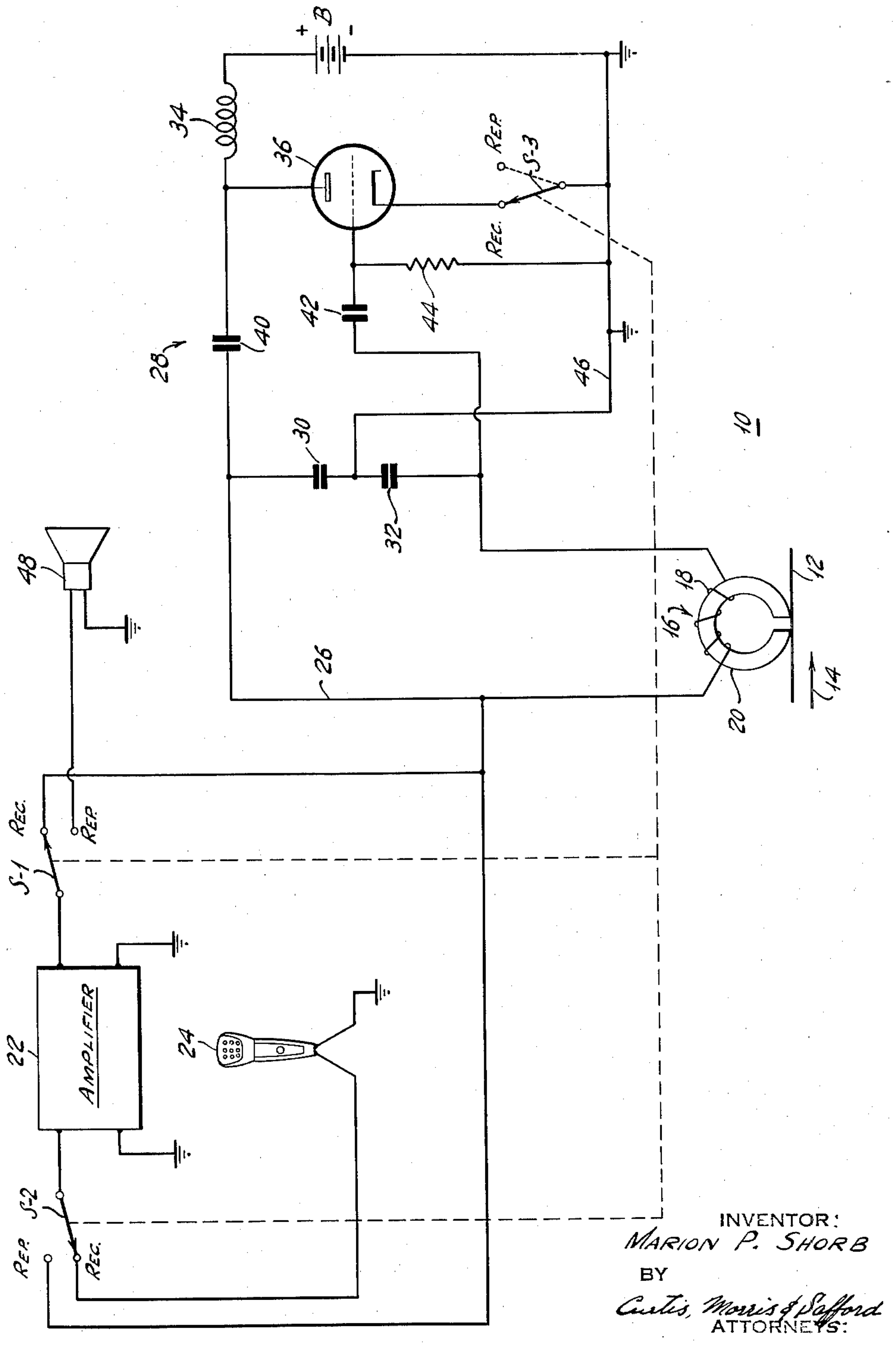
INVENTOR:
MARION P. SHORB
BY
Curtis, Morris & Safford
ATTORNEYS:

2,965,722

MAGNETIC REPRODUCING APPARATUS

Marion P. Shorb, Fairfield, Conn., assignor to Dictaphone Corporation, Bridgeport, Conn., a corporation of New York Filed Feb. 4, 1957, Ser. No. 638,040

1 Claim. (Cl. 179—100.2)

This invention relates to an improved arrangement for magnetic recording and reproducing wherein a high-frequency bias or erase current is used.

An object of this invention is to provide an improved circuit for supplying high-frequency bias or erase currents to a magnetic head.

A further object is to provide such a circuit in which a single magnetic head can be used for recording, and for playback of a signal recorded on a magnetic record.

A still further object is to provide a circuit for use in conjunction with a multi-purpose head of the above kind, wherein the head is automatically demagnetized prior to a playback operation.

These and other objects will in part be understood from and in part pointed out in the description hereinafter.

In prior art systems of magnetic recording, such as that disclosed in U.S. Patent 2,694,108, high-frequency currents are supplied to a transducer head from an oscillator having a separate tank circuit. To couple these bias currents to the head requires a connecting circuit such as a buffer amplifier, and involves the problem of matching impedances. Accordingly, substantially more biasing power must be generated than is actually used in the transducer head, resulting in bulky and expensive equipment. The present invention in one of its aspects avoids this difficulty.

Where a single head is used for both recording and playback with a magnetic record, bias currents, when used, must be applied directly to the head. These currents, however, when suddenly interrupted, as in switching the system from recording to playback, can leave an undesirable amount of remanent magnetization in the head. To prevent this, and to insure that the head is magnetically "neutral" during a playback operation, various schemes for demagnetizing the head have been developed in the past. One of these is shown in the above-mentioned patent. The present invention in another of its aspects provides an improved arrangement which insures that the reproducing head is left magnetically neutral after switchover of its associated system from recording to playback.

In accordance with the present invention a magnetic recording system is provided wherein a single head is used for both recording and playback. This head has a single winding which serves as the tank coil of the high-frequency bias current oscillator and also as the signal winding for the information being recorded. By using the head winding as the tank coil of the oscillator, an increase in efficiency of the order of 300 percent is obtained; hence the oscillator and its associated components can be correspondingly reduced in size.

To prevent the reproducing head from being left in magnetized condition when the bias current is switched off, the circuit is arranged so that upon switchover of the system to playback condition, the tank capacitor remains connected to the head winding and circulating currents are permitted to decay without interference from the oscillator power tube. This un-interrupted decay of current in the tank circuit is exponential and acts to demagnetize the reproducing head thereby leaving it in neutral condition.

A better understanding of the invention together with a fuller appreciation of its many advantages will best be gained from a study of the following description given in connection with the accompanying single figure of the drawing which shows a circuit embodying features of the invention.

Referring to the drawing, there is shown herein a circuit 10 to be used in conjunction with a magnetic record 12. This record is adapted to be moved at a constant velocity in the direction of arrow 14 past a reproducing head generally indicated at 16. This head includes a single winding 18 and a core 20 of suitable magnetic material. In the condition shown, circuit 10 is arranged for recording during which operation head 16 impresses a varying magnetic flux on record 12. This varying magnetic flux is derived from signal currents applied to winding 18 through the switch S–1, the amplifier 22, the switch S–2 and the microphone 24. The operation of these components is generally like that disclosed in the above-mentioned patent.

Simultaneously with the signal currents received from amplifier 22 via switch S–1, bias currents having a high frequency, for example, 30 kilocycles, are supplied to winding 18 via the lead 26 from the oscillator generally indicated at 28. The tank circuit for this oscillator includes head winding 18 and the series capacitors 30, 32 connected in parallel therewith. Power for oscillator 28 is supplied by the battery B through the high-frequency choke 34 to the plate of the tube 36, and through the switch S–3 to the cathode of this tube. A large capacitor 40 prevents direct current, but not alternating current, from reaching lead 26 and winding 18. A capacitor 42 connects the grid of tube 36 to the low side of winding 18. The grid of this tube is connected to the cathode through the grid-leak resistor 44. The negative terminal of the battery B is connected through the lead 46 to the junction of capacitors 30, 32. This portion of the circuit operates as a Colpitts oscillator and is well known to the art.

Because winding 18 of head 16 serves as the tank coil of the high-frequency oscillator, the biasing effect is provided by the current which circulates in the tank resonant circuit including the winding and the capacitors 30, 32. Since this circulating current is of appreciable magnitude relative to the current that could be coupled from the tank circuit to an external load, the required bias effect can be achieved with a relatively small amount of power supplied by battery B and tube 36. Accordingly, these components can be correspondingly small in size and no intermediate coupling arrangement is required between the oscillator and the head.

To switch circuit 10 from recording to reproducing or playback, the switches S–1, S–2 and S–3, which are all ganged together, are moved clockwise from REC to REP position. The action of these switches is slow enough so that while their contacts are moving from REC to REP, the bias current circulating in the tank circuit of winding 18 and capacitors 30, 32 will have decayed smoothly to zero. The Q of this tank circuit is only moderately high, for example 10, so that these oscillations die out relatively soon after tube 36 has been disconnected by switch S–3. This switch is placed so that when it is moved from REC position, tube 36 can have no effect thereafter on the current still circulating in the tank circuit. To prolong the die-out time for the circuit, a capacitor can be connected across switch S–3.

When all of the switches have been moved to REP position, signals previously recorded on record 12 can be picked up by head 16. These signals are applied through switch S–2 to amplifier 22, through the switch S-1 and thence to the loudspeaker 48 where they are reproduced as audible sounds.

Head 16 can be used as an erase head in which case it would not be connected to amplifier 22 and a separate recording head would be provided.

The above description of the invention is intended in illustration and not in limitation. Various changes or modifications in the embodiment described may occur to those skilled in the art and may be made without departing from the spirit or scope of the invention as set forth.

I claim:

In a magnetic recording-reproducing system a single transducer head for recording and for playback, a winding on said head, capacitor means connected in parallel and resonant with said winding at a supersonic bias frequency, and amplifier connected in parallel with said winding to apply thereto an audio recording signal, and a single three-electrode amplifier having two output electrodes and a control electrode, means connecting said output electrodes to said winding and capacitor means to apply oscillatory energy thereto, means returning part of said energy to said control electrode to sustain oscillations, a power source, and a switch connecting said source in series with said output electrodes, whereby the oscillatory energy in said winding is fully utilized and by opening said switch the oscillations in said winding die gradually all the way to zero to demagnetize it.

References Cited in the file of this patent

UNITED STATES PATENTS

| | | |
|---|---|---|
| 2,351,009 | Camras | June 13, 1944 |
| 2,531,141 | Lootens | Nov. 21, 1950 |
| 2,589,035 | Begun et al. | Mar. 11, 1952 |
| 2,604,550 | Begun | July 22, 1952 |
| 2,694,108 | Taylor | Nov. 9, 1954 |

FOREIGN PATENTS

| | | |
|---|---|---|
| 1,044,538 | France | Nov. 18, 1953 |